United States Patent [19]

Moorer

[11] Patent Number: 4,497,023
[45] Date of Patent: Jan. 29, 1985

[54] LINKED LIST OF TIMED AND UNTIMED COMMANDS

[75] Inventor: James A. Moorer, San Rafael, Calif.

[73] Assignee: Lucasfilm Ltd., San Rafael, Calif.

[21] Appl. No.: 439,125

[22] Filed: Nov. 4, 1982

[51] Int. Cl.³ .............................................. G06F 1/00
[52] U.S. Cl. .................................................. 364/200
[58] Field of Search ... 364/200 MS File, 900 MS File

[56] References Cited

U.S. PATENT DOCUMENTS 4,047,248  9/1977  Lyman et al. ................... 364/900
4,281,393  7/1981  Gitelman et al. ................ 364/900

FOREIGN PATENT DOCUMENTS 2017987  10/1979  United Kingdom .

OTHER PUBLICATIONS

Moorer, J. A., "Synthesizers I Have Known and Loved", Computer Music Journal, vol. 5, No. 1, 1981, pp. 4-12.
Sakamoto, N. et al., A Professional Digital Audio Mixer", J. Audio Eng. Soc., vol. 30, No. 1 & No. 2, Jan./Feb. 1982, pp. 28-33.
Richards and Craven, "An Experimental 'All-Digital' Studio Mixing Desk", J. Audio Eng. Soc., vol. 30, No. 3, Mar. 1982, pp. 117-126.
McNally, G. W., "Microprocessor Mixing and Processing of Digital Audio Signals", J. Audio Eng. Soc., Oct. 1979, pp. 793-803.
Samson, P., "A General-Purpose Digital Synthesizer", Audio Eng. Soc., Mar. 1980, pp. 106-112.
Alles, H. G., "Music Synthesis Using Real Time Digital Techniques", Proc. I.E.E.E., vol. 68, No. 4, Apr. 1980, pp. 436-449.
Loy, D. G., "Notes on the Implementation of MUSBOX", Computer Music Journal, vol. 5, No. 1, 1981, pp. 34-50.
Moorer, J. A., "Signal Processing Aspects of Computer Music: A Survey", Proc. I.E.E.E., vol. 65, No. 8, Aug. 1977, pp. 1108-1137.
McNally, G. W., "The Use of a Programmed Computer to Perform Real-Time Compounding of High-Quality Sound Signals", BBC Research Dept. Report, Apr. 1978, pp. 1-8.
McNally, G. W., "A Computer-Based Mixing and Filtering System for Digital Sound Signals", BBC Research Dept. Report, Mar. 1979, pp. 1-13.
Moorer, J. A., "The 4C Machine", Computer Music Journal, vol. 3, No. 3, 1979, pp. 16-24.

Primary Examiner—Raulfe B. Zache
Attorney, Agent, or Firm—Majestic, Gallagher, Parsons & Siebert

[57] ABSTRACT

One or more high speed programmable digital signal processors, particularly for audio processing such as mixing, sound effects and synthesizing, are supported by one or more slower speed computers that provide timed and untimed update commands to the high speed processors. Untimed commands are originated as by real-time operator gestures. Timed commands are originated by a master support computer. A queue of update commands is maintained in the high speed processor such that untimed commands are placed at the head of the queue for immediate execution and timed commands are placed at the end of the list. New timed commands are interleaved in time order with timed commands already in the queue.

8 Claims, 4 Drawing Figures

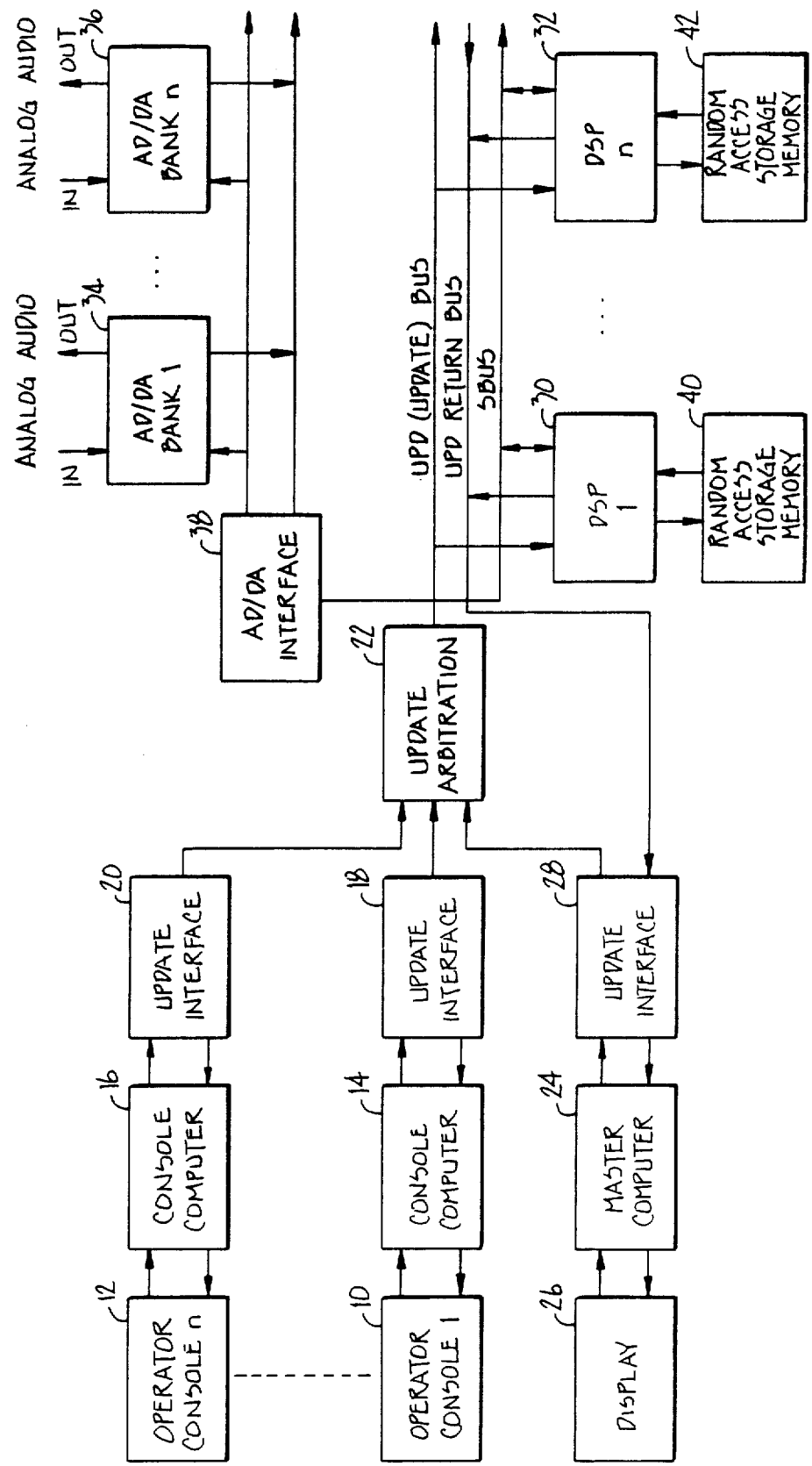
FIG._1.

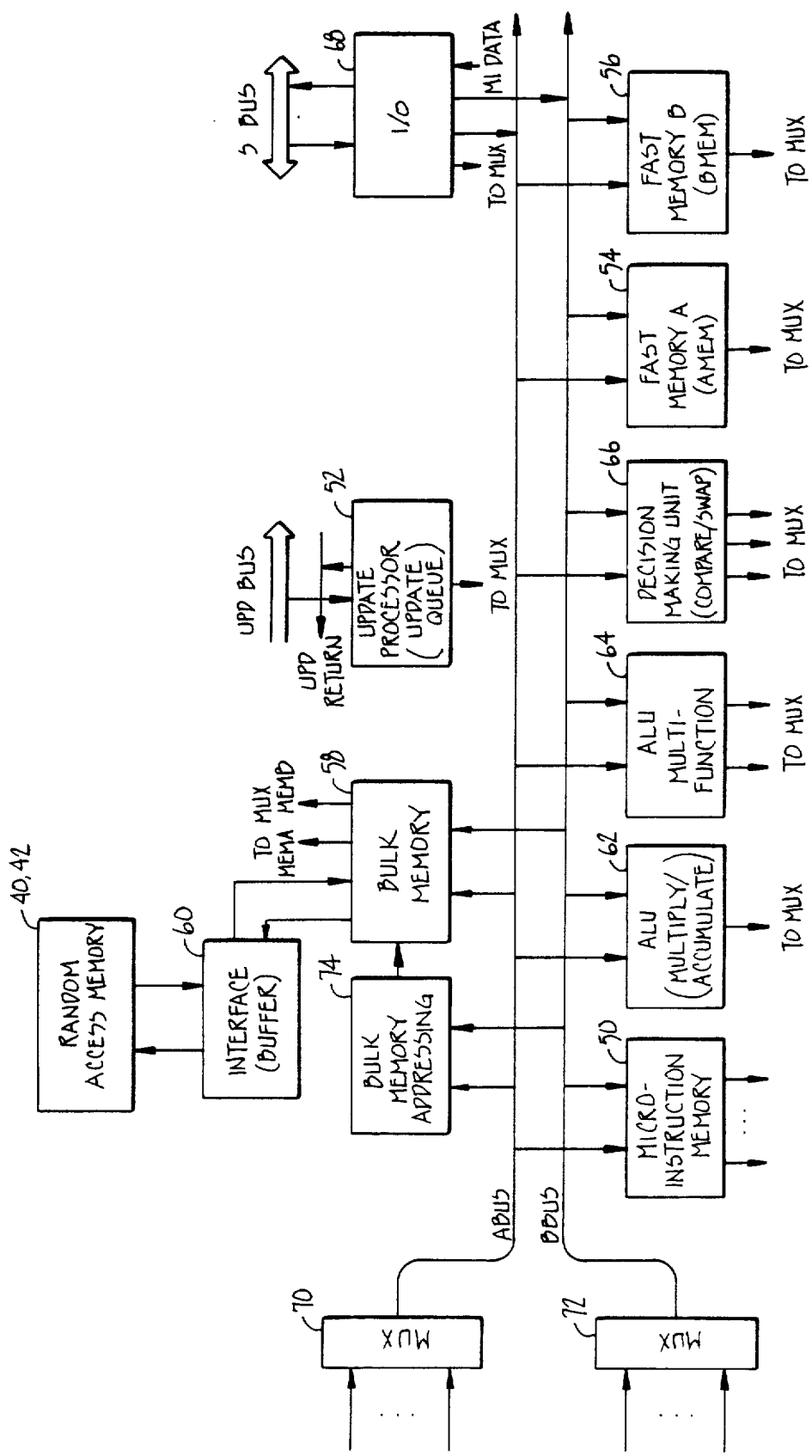
FIG._2.

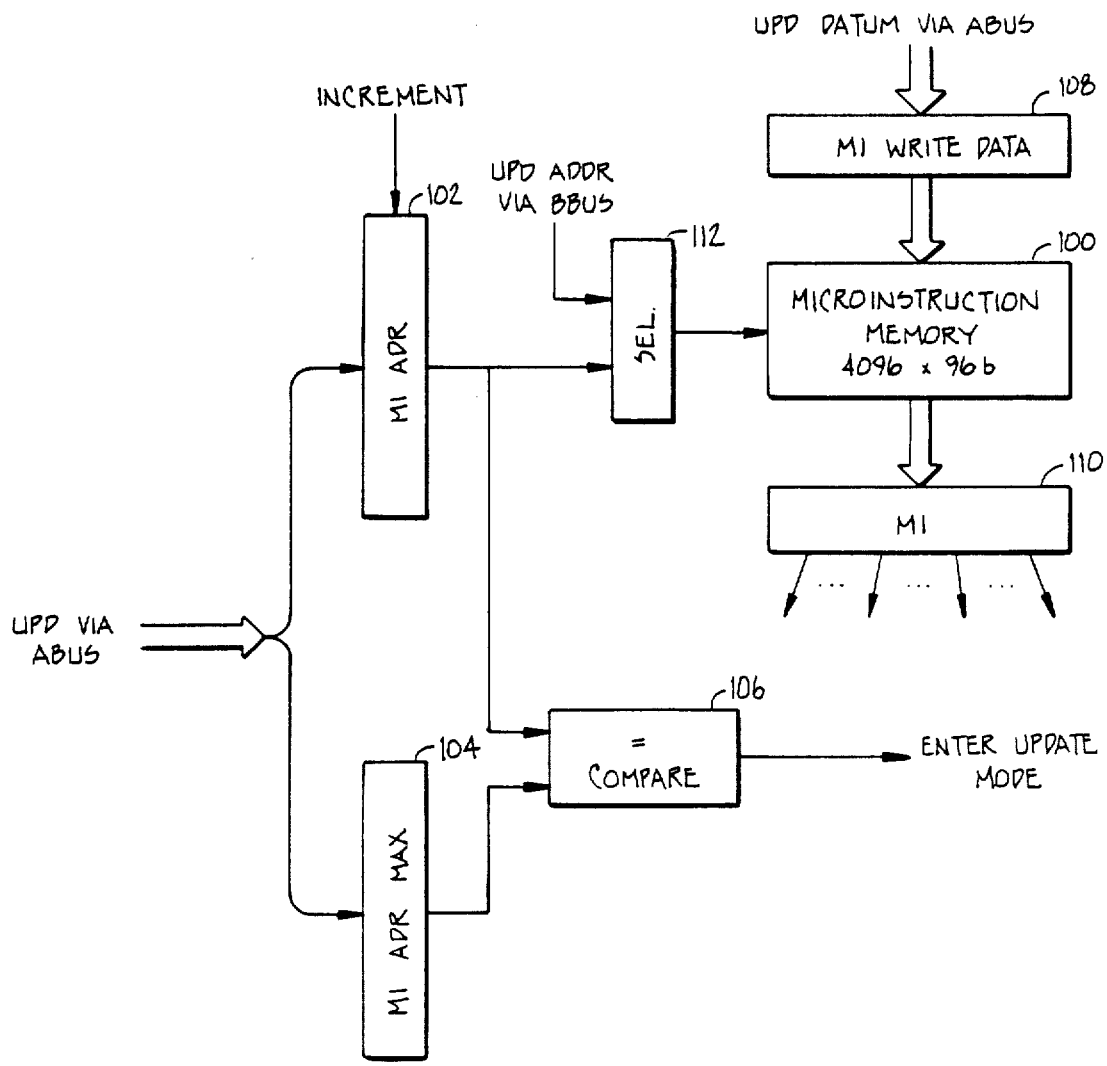
FIG._3.

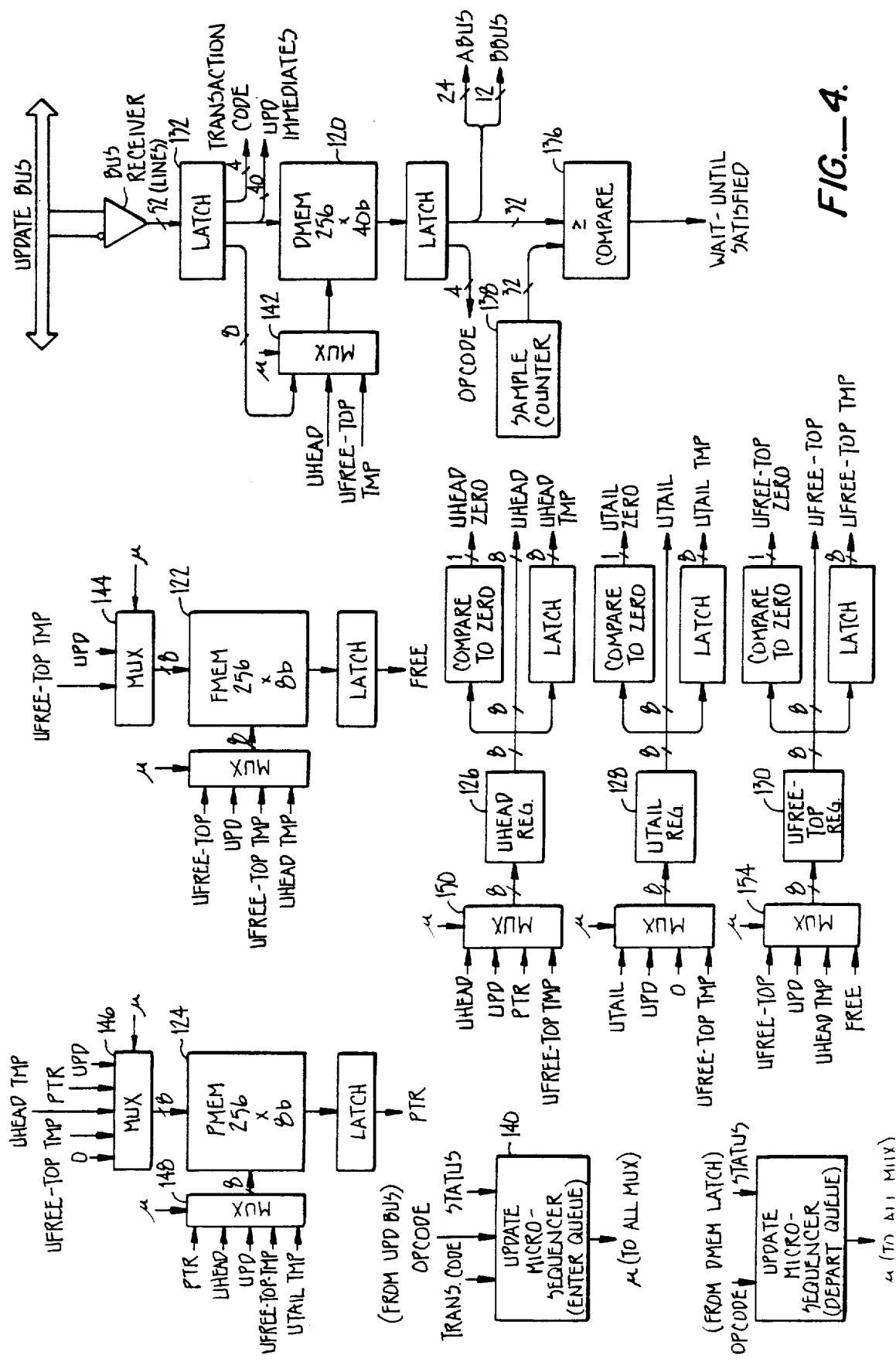
FIG._4.

LINKED LIST OF TIMED AND UNTIMED COMMANDS

BACKGROUND OF THE INVENTION

The invention relates generally to digital audio signal processing and in particular to an improved method and apparatus for use in real-time digital audio processing. Although the invention is described in the environment of a system for large-scale real-time audio processing, such as film sound mixing, special effects processing, and music synthesis, it is applicable in general to other programmable real-time digital signal processing devices.

The basic techniques for digitally synthesizing, processing and recording audio signals are well known. For example, complex waveforms can be digitally generated to stimulate speech and musical instruments or to create totally new sounds. Digital audio, synthesized or converted from analog form, can be processed in highly complex ways to simulate filtering, equalization, etc. Digital audio signals can be recorded and played back. They can be mixed digitally. See for example the articles "Signal Processing Aspects of Computer Music: A Survey" by J. A. Moorer, Proc. I.E.E.E., Vol. 65, No. 8, August, 1977, and the extensive bibliography therein and "Music Synthesis Using Real Time Digital Techniques" by Harold G. Alles, Proc. I.E.E.E., Vol. 68, No. 4, April, 1980. See also "A Professional Digital Audio Mixer" by N. Sakamoto et al., J. Audio Eng. Soc., Vol. 30, No. ½, January/February, 1982 and "An Experimental 'All-Digital' Studio Mixing Desk" by Richards and Craven, J. Audio Eng. Soc. Vol. 30, No. 3, March, 1982.

One well-known approach to digital audio synthesis and processing is to program a general purpose computer to perform the various digital computations required for particular applications. A serious draw-back to this approach is that a large capacity high speed computer with a powerful instruction set is required for all but the simplest tasks, particularly if multiple simultaneous processing functions or real-time processing are required.

In professional audio applications, the demands on a digital system are particularly severe. For example, to simulate entirely the processing of a modern 32 track mixing console requires a sustained rate on the order of 60 million multiplications per second, a rate that is substantially beyond all but the most powerful of the general-purpose computers.

One known solution to the requirements of high speed calculation coupled with sustained high-bandwidth input/output is to provide a high speed processor to carry out the sequences of digital audio processing operations under the supervision of a slower general purpose computer.

A requirement in all digital signal processors is that the processing parameters (filter coefficients, for example) or the nature of the processing (filtering or equalizing, for example) changes with time (sometimes very quickly). Consequently, some means is required to control the time varying processing not only by means of initial commands implemented in software, hardware or a combination thereof, but also by means of updates to those commands.

In known systems where a high speed processor is supervised by a support computer, the support computer supplies processing commands to the high speed processor. The manner in which commands and command updates are handled presents special problems particularly in systems controlled in real-time.

One such system for digital audio having parallel processors is disclosed in "Microprocessor Mixing and Processing of Digital Audio Signals" by G. W. McNally, J. Audio Eng. Soc., October, 1979, pages 793–803 and in McNally's published U.K. patent application No. 2,017,987. McNally employs two separate computers, a high speed microprogrammable processor and a slower support microprocessor, which are linked by a commonly accessed memory such that in operation the high speed processor can effect processing in dependence upon parameters written into the memory by the slow speed processor. The high speed processor is synchronized with the audio samples during one of the 192 microinstruction cycles between each audio sample, and during that same cycle new parameters can be entered in the memory. The basic nature of the processing itself is determined by the microprogram initially loaded in the high speed processor and which is not changed once loaded. For example, the microprogram may provide for a digital transverse filter to be implemented by means of controlling the arithmetical and logical functions of the CPU within the high speed processor and by employing the filter parameter data in the commonly accessed memory in performing those operations.

Another digital sound processor arrangement in which a high speed processor runs in parallel with a support computer, and in which the high speed processor has a memory directly accessible by the support computer is the 4C system designed as a musical performance device at IRCAM by Pepino di Giugno and described in "The 4C Machine" by Moorer et al., Computer Music Journal, Vol. 3, No. 3, Fall, 1979, pages 16–24 and in "Synthesizers I Have Known and Loved, by J. A. Moorer, Computer Music Journal, Vol. 5, No. 1, Spring, 1981, pages 4–12.

The 4C System's high speed processor (the 4C "Machine"), is more elaborate than in the McNally system, providing seven PROM's (programmable read only memories) accessible to the support computer allowing not only changes to the parameter data but also changes to the machine programming. Thus, the support computer can also change the nature of the high speed processing.

Both the McNally system as disclosed and the 4C System suffer from the problem that both place a substantial burden on the support computer to issue commands for immediate execution by the high speed processor and there is no means for synchronizing the exact arrival time of the data update commands with a particular sample number. This is disadvantageous because audible clicks or pops can occur for example, from the non-simultaneous onset of processing associated with a sound beginning at a particular sample time. Also, in both systems the processor clock period has a random phase with respect to the support computer instruction cycle. Consequently, there is an unpredictable time delay between the generation of a data update by the support computer and its execution by the processor. This is a further disadvantage that can cause results such as perceptual stereo image shifts and relative microshifts within a musical note.

A large scale digital synthesizer having certain general signal processing capabilities is described in "A General-Purpose Digital Synthesizer" by Peter R. Samson, J. Audio Eng. Soc., March, 1980, pages 106-112, and in the above cited articles "Signal Processing Aspects of Computer Music: A Survey" (at pages 1134-1135, "The Systems Concepts Digital Synthesizer") and "Synthesizers I Have Known and Loved". The Systems Concepts device has a fixed menu of functional modules: up to 256 "generators" and 128 "modifiers", each of which having a control memory, written by a CPU, that determines its function and holds its running values and parameters. A 28-command FIFO (first-in, first-out memory) stores all data updates to the control memories in the form of "linger" commands from the support computer that contain timing information. Thus, the system assures that updates will occur during a specific sample and lessens the burden on the support computer by allowing it to fill the command FIFO ahead of time. The latter feature is particularly useful because update commands tend to occur in bursts of extremely high bandwidth. However, this arrangement does not allow for adjustment of parameters in real-time, since each command is held for execution until the sample time tagged to it before the next command is examined. Hence, a command insert will not take effect until some time in the future, depending on what commands are already in the FIFO.

Another digital audio processor in the form of a parallel system is described in the above cited article "An Experimental 'All-Digital' Studio Mixing Desk" by Richards and Craven. In the system described real-time digital processing hardware is supported by a central control processor. The digital processing hardware provides certain dedicated mixing and equalization functions; it is not programmable as are the McNally and 4C Systems.

Thus, several systems are known having a high speed digital audio processor running in parallel with a slower support computer, in which the high speed processor has a memory accessible to the support computer into which it places processing commands. The high speed processors range from dedicated hardware to programmable general purpose hardware. In the McNally and 4C Systems, the processing commands are untimed. That is, they cannot be associated with specific sample times and are executed immediately subject to the timing uncertainties discussed above. In the Systems Concepts system, the processing commands are stored in a FIFO and are timed such that they are always associated with specific sample times.

The above cited article by Moorer, "Synthesizers I have known and Loved" discusses generally the problems in configuring a command structure, including those inherent in "timed and untimed" systems, such as those just mentioned. Also discussed is the problem of merging multiple sets of commands, as occurs, for example, in synthesizing noninteracting musical notes, each note being composed of a number of simultaneously emerging envelopes. In the known systems, this merge is accomplished in the support computer by software that interleaves the data into a single stream which is then written into the high speed processor. In the case of the Systems Concepts' embedded timing information command stream, keyboard control or other real-time asynchronous control events essentially would be ruled out because the new data would have to be merged into the already existing command stream. This is not possible for the commands that are already in the FIFO (new commands go to the end of the list).

Thus, although the timed command approach in the Systems Concept device overcomes certain of the inherent problems in the untimed command approach of the 4C and McNally Systems, it is apparent that it is not practical for a system that must respond to unplanned asynchronous real-time user controls.

In the conclusion of the said "Synthesizers I Have Known and Loved" article it is suggested that if real-time control by a user is desired that either a secondary command update path be provided or that timing information on commands be eliminated as in the 4C system. The secondary path suggestion has the disadvantage that the complexity resulting from a second command stream is created. The disadvantages of the 4C system approach have been discussed. The article also suggests as a solution to the merge problem a microprogrammed processor in which sequentially running programs can read independently from separate command data streams. A significant disadvantage of such an approach is that a very large number of parallel processes would be required in a practical system.

Thus, the prior art has failed to provide an optimized command structure for digital processing systems of the type where a high speed processor has a slower support computer. Particularly, the prior art does not solve the problem of a practical real-time processing system with real-time control such that command updates of known and unknown timing are simultaneously present.

A timed command may be defined as a command that is to take place at a specific and known sample number (or between two specific and known sample numbers). An untimed command is one for which the sample number is not known beforehand.

More specifically the prior art fails to provide a command organization that can accommodate not only a known list of timed commands in addition to asynchronous untimed commands but also the merging of a further known list of timed commands that immediately results from many untimed commands. For example, if the processor is being played like an organ, there may be a known score running, which has many timed commands. If an organ key is pressed, the attack portion of the note requires a precisely timed sequence of commands, the timing of which is known as soon as the key is pressed, but it was not known until the key was pressed.

SUMMARY OF THE INVENTION

These and other problems in the prior art are solved in accordance with the teachings of the present invention, in which a command apparatus and method is provided for use in digital processing systems of the type having a high speed digital processor operating with a support computer. The command apparatus and method of this invention provides for the establishment of an "update queue", which is a linked list, implemented in hardware, that provides the update command data stream to the high speed processor. The update queue accommodates both timed and untimed update commands. Untimed commands are placed at the "head" of the queue for immediate execution by the high speed processor. Timed commands, including those from a new list, are arranged in the update queue in time order of execution.

It will be appreciated that the designation of the "head" or "beginning" and "end" of the queue is semantic. The essence of the update queue operation is that untimed commands are always placed at a location in the queue that is the next location from which an update command is removed for execution. It is that sense in which "head" or "beginning" of the queue is used. Timed commands always "follow" any untimed commands in the queue in that they are removed for execution after the untimed commands. Thus, at any given instant, the queue is a linked list having a list of update commands that are removed for execution in the order they are linked.

The update queue is an ordered list of update commands that modify the operation of the high speed processor. Generally, the support computer places known timed updates into the queue in timed order some time prior to the time they are to be executed. These timed update commands may have originated from any number of events in the past. They may consist of an interleaving of timed update commands to cause several processing functions. The manner in which timed and untimed updates are generated prior to their placement in the queue is not the subject of this invention, although the environment of the invention is discussed, including generally the sources of command updates. One aspect of the update queue of the present invention is that a single queue of updates is provided for execution by the processor. This is possible by including both timed and untimed updates in the same queue.

Another aspect of the invention is the interleaving or merge of update command data that has already been placed in the update queue. For such data, the invention provides for the insertion of the new update command data to be merged at its properly timed location in the queue. It will be appreciated that interleaving in the queue is only required for those new updates occurring within that period of time for which the support computer has worked ahead. The later occurring new updates can be interleaved in the support computer to provide a revised list. See for example the article "Notes on the Implementation of MUSBOX" by D. G. Loy, Computer Music Journal, Spring, 1981, Vol. 5, No. 1, pages 34–50.

While the precise implementation of the update queue can take many forms, in the preferred embodiment a special purpose buffer memory function is implemented as three random access memories in the high speed processor, denoted the data memory (DMEM), the pointer memory (PMEM) and the free list memory (FREE). The pointer and free list memories can be implemented as a single memory with a sacrifice in speed. There are three registers that operate in conjunction with the memories: the HEAD, TAIL and FREE-TOP registers. The HEAD and TAIL carry the addresses within DMEM and PMEM of the elements at the beginning and end of the queue, respectively. FREE-TOP carries the address of the first element on the free list. A sequencer receives on an update bus the update commands, which include a code indicating if the command is to be inserted at the beginning of the queue, at the end, or after a specific command already in the queue.

The controlling computer maintains its own maps of the queue in order that it can properly issue "insert after" commands. In addition to keeping track of the state of the queue by noting the location of every timed update that goes into the queue (an "update return" is sent back to the controlling computer), the controlling computer constantly surveys the sample clock in order to keep the update queue sufficiently filled. The controlling computer also responds to real-time control by inserting immediate updates resulting therefrom at the head of the queue and for the "new list" of timed updates resulting from a real-time control action it checks to see how much of the "old list" of timed updates is already in the queue and provides a merge "on the fly" for timed updates later than those already in the queue.

In the preferred environment for the invention the control computer function is divided among several support computers, one of which is designated the master. Non-master computers interface with operator consoles to provide functions including the translation of operator control gestures into the digital format. A computer network, such as Ethernet, provides communication among the various computers. The console computers generate update commands in cooperation with an associated update bus interface. By convention, update commands from console computers are of the "insert before" type (e.g. untimed updates) that are placed at the head of the queue. The master computer, which also has an update bus interface, by convention only generates "insert at end" and "insert after" update commands (e.g. timed updates). Update returns from the queue are sent to the master computer. By allowing only one computer to generate timed updates the task of keeping track of the queue is simplified. In principle, with proper communication and software, several computers could provide timed updates. A priority system for arbitration of simultaneous requests receives the updates from the console and master computers and time multiplexes them onto the update (UPD) bus.

In the preferred environment of the invention, the high speed processor, referred to as a digital signal processor (DSP), is a microprogrammed high-speed pipelined numerical processor for digitized audio. Several memories within the DSP are available for writing in by update commands, including the microprogram memory and scratchpad memories for parameters.

Inside the DSP itself, there are separate functional units for dealing with each of the main problems in this kind of device: (1) transferring data to and from data storage disks continuously at near the maximum rate, (2) effecting the required numerical calculation rate, (3) transferring data to and from the AD (analog to digital) and DA (digital to analog) converters, and (4) handling changes to microcode and parameters. All digital audio processing is routed through the DSP. The ability to update the microprogram and parameters (in real-time) provides a highly flexible high-speed processor capable of a large variety of processing tasks.

In practice several DSP's can be operated in parallel in order to provide greater processing capability, as for example in processing multiple channel audio. The DSP's operate asynchronously with respect to the AD and DA conversion and with respect to the support computers. Part of each DSP operating cycle is its processing mode during which its current microcode program is executed and the other part is a variable length update mode during which updates are processed.

A sample counter is available to all of the support computers. In addition each DSP maintains a copy of the sample counter in order to avoid time delays.

There are three categories of uses to which the update queue is applicable. In general, its need stems from the fact that the signal processor (the DSP) is enormously faster than the controlling computer. For this reason, and the desire to slow down the DSP as little as possible, there is a buffer memory (the update queue)

which is filled by the controlling computer and console computers as fast as they can, and then emptied by the DSP at its full computational rate (typically 20 times faster than the control computers).

The three categories of uses for the update queue are as follows:

Audio Processing For Which The Timing Is Entirely Known Beforehand

In this case each update (change) is associated with a time (an audio sample number) at which it is to happen. These updates form a list in time order which is then forwarded to the update queue. The program in the control computer sends updates to the DSP until either it is "sufficiently" in advance of the DSP, or until the update queue is full. The program will try to stay ahead of the DSP by some amount (say 15 to 25 milliseconds) at all times. The program will always insert at the rear of the queue. It will place a new WAIT-UNTIL in the queue to indicate the time at which the changes are to occur, followed by all the updates that are to occur at that time. We might think of this as "piano roll" mode.

Changes Which Are To Be Reflected Immediately In The Sound

The program in the console computers will insert all updates at the beginning of the queue, thus placing them before any WAIT-UNTILs that the control computer may have inserted. The next time the DSP goes into update mode, all the changes that have been put at the beginning of the queue will be processed immediately. This assures that the change happens as soon as is possible.

Sequences Of Changes For Which The Starting Time Is Unknown

This is exemplified by an organ tone. When a key is pressed, we may wish a complicated sequence of actions to happen (the attack transients of the new tone), but for which the starting time (the exact time when the key will be pressed) is not known beforehand. In this case, a new list of time-ordered changes must, as soon as the key is pressed, be created and merged into any known sequence of changes that is already being forwarded to the DSP. This new list is in addition to any immediate update that is generated by the console computer for insertion at the head of the queue. The new list is generated by the master computer in response to a request by the originating console computer via the network. Since some of these changes in the list that is already in progress may have already been placed in the update queue with WAIT-UNTILs, the new sequence will have to be merged in with the use of the INSERT-AFTER instruction, which allows one to place, for instance, a new WAIT-UNTIL between two that are already in the queue. The control program will then read through the list of changes, determine which ones are already in the queue, and do either an INSERT-AFTER for those that are in the queue, or simply merge the lists in the control computer's memory for those that are not yet in the queue.

The control computer has a piece of support software called the update return monitor. This piece of code does two things: it examines each update return so as to keep track of what addresses in the update memory the WAIT-UNTILs were placed at. It also looks at the sample counter to decide which of the WAIT-UNTILs in the queue have already been processed, and can thus be forgotten. So when the control program, as described above, wishes to know the address of a particular WAIT-UNTIL, it can insert some new changes between two WAIT-UNTILs, it is the update return monitor that has kept track of this information.

BRIEF DESCRIPTION OF THE DRAWINGS

FIG. 1 is a block diagram showing the physical environment of the invention.

FIG. 2 is a functional block diagram of a digital signal processor in which the invention is embodied.

FIG. 3 is a functional block diagram of the microinstruction memory that forms a part of the digital signal processor of FIG. 2.

FIG. 4 is a physical block diagram of an update processor embodying the present invention.

DESCRIPTION OF THE PREFERRED EMBODIMENT

In FIG. 1, the physical system environment is shown generally in block diagram form. For clarity, in this and other figures, system elements and interconnections not relevant to an understanding of the invention are omitted. A plurality of operator consoles 10, 12 (up to eight, for example) each has an associated console computer 14, 16. Each console, comprised of an operator console and console computer is, for example, a stand alone Motorola 68000 microcomputer with a special purpose control panel having various kinds of control devices, such as slide potentiometers and knobs or organ keyboards. The console computers provide various support functions to the operator console including the conversion of operator control gestures into digital form and the generation of displays for the control panel. In addition, the console computers can provide certain low speed support functions for the DSP's such as computing filter parameters. The console computers generate updates in response to actions at the operator console and apply them to the respective update interfaces 18, 20. The update interfaces 18, 20 are each a set of four registers into which the console computers place an update command. When the registers are filled, the update is placed on the UPD (update bus) via the update arbitration switch 22. The master computer 24, which can be a Motorola 68000 with Winchester disk, one megabyte of main memory and an associated high resolution bit map graphical display 26, also sends updates to the arbitration switch 22 via its bidirectional update interface 28. Interface 28 is the same as interfaces 18, 20 for transmittal updates and it also has a receive interface that can include a buffer memory for receiving update returns. The buffer memory is to avoid any loss of update return data that is available only briefly. The arbitration switch gives lowest priority to updates from the master computer. Updates from the console computers can be taken in arbitrary order. Updates are then time multiplexed onto the UPD bus.

A plurality (up to eight, for example) of DSP's 30, 32 receive updates from the UPD bus and provide update returns back to the master computer. A bi-directional SBUS carries digital audio information between the DSP's and a plurality (up to eight, for example) of AD and DA banks 34, 36 via an AD/DA interface 38. The latter interface provides buffering in view of the asynchronism between the DSP's and the sample clock rate.

Each DSP has access to a respective random access memory 40, 42. The memories are 300 megabyte disk packs, for example, although more dense storage systems (such as optical storage, when it becomes commercially practical) would be useful in view of the substantial storage requirements.

In a practical embodiment of the system of FIG. 1, each DSP is designed to handle eight channels of audio at a sampling rate of 50 kHz. With eight DSP's, a maximum of 64 channels can be handled. Each DSP has a computational rate of about 18 million 24-bit integer multiply-adds per second, simultaneous with a sustained disk transfer rate of 6.4 million bits per second (800k bytes per second) and a sustained AD/DA convertor transfer rate of 6.4 million bits per second. If the 300-mb disk packs are formatted in a standard way (32 sectors per track at 512 bytes per sector), each will hold 42 minutes of monaural sound. Since a 70 mm motion picture film print employs six tracks of sound, a single pack then holds between six and seven minutes of six track sound. It will be appreciated that this practical embodiment is only one example of an environment for the present invention.

Refer now to FIG. 2, which shows a functional block diagram of a DSP. Each DSP includes a microinstruction memory (along with associated instruction registers and logic) 50, an update processor 52 that holds the update queue, a fast memory for temporary storage (in two sections—AMEM 54 and BMEM 56), a slow memory 58 for bulk storage (which has direct memory access through an interface 60 to the random access storage memory 40, 42), a bus (implemented as two busses ABUS and BBUS), an arithmetic logic unit (ALU) (in two sections, a multiply/accumulate 62 and a multifunction unit 64, e.g. add, subtract, AND, OR, EXCLUSIVE-OR, etc.) a decision making unit 66 (a comparison followed by a swap) and an input/output (I/O) interface 64. The busses receive inputs from the multiplexers 66 and 68. Micro-instructions from block 50 are distributed throughout the DSP and control its functions. For clarity the various control apparatus (which sets multiplex addresses, provides write pulses, strobes, latches, etc.) are not shown. Except for the update processor, each of these units in the DSP is in itself well known in the art. The DSP is a pipelined processor such that the execution of instructions is stretched over several instruction cycles. Pipelined processors are per se known in the art.

Each DSP has a 50 nanosecond instruction cycle and is programmed with 4k 96-bit microcode words. The device is a lockstep, synchronous machine. If several DSP's are employed it is convenient to have them work in synchronism with each other to simplify inter-processor communication, although in principle the processors can be implemented as non-synchronous with each other. The instruction counter starts at zero, goes to a fixed limit, then returns to zero at which time it goes into update mode, which lasts at least 4 instruction cycles if there are no updates. The length of the update mode is expandable to accommodate a maximum of 255 updates at one time.

The heart of the numerical part of a DSP is the multiply-accumulate unit 62, the scratchpad memories 54, 56 (AMEM and BMEM), and the busses (ABUS and BBUS). The ABUS and the BBUS are two 24-bit busses, which supply data to each of the arithmetical units. Each micro-instruction has two 4-bit fields that specify the source of each bus, and a number of bits saying which arithmetic unit input latches are to receive the contents of these busses. On each 50 nanosecond instruction, two 24-bit data are selected and forwarded, via the busses, to the input latches of some functional units. For ease of programming, the two 16-input multiplexers 70, 72 are identical. This makes the busses largely interchangeable to the programmer and greatly simplifies the programming task.

The multiply-accumulate unit 62 consists of a 24×24 signed/unsigned multiplier that develops a 48-bit product, followed by a shifter that is capable of shifting left up to three places and right up to four places, followed by a 48-bit accumulator. This allows the partial products for a digital filter to be summed in double precision, permitting later truncation to single precision, or the use of even higher precision. There are pipeline registers in the multiplier so that a full multiply may be started every 50 nanoseconds (that is, every instruction). If a multiply is started on instruction N, its results may be selected onto one of the busses on instruction N+2, and the output of the accumulator may be selected on instruction N+3. The output of the multiplier may be either added into or subtracted from the accumulator contents.

Even in a "stream" machine when program branches are not being used, decision-making is still necessary. There are two methods for doing this: one is the compare/exchange unit 66, and the other is the conditional execution of microinstruction. There is a condition code that is set by a microinstruction that specifies the condition, such as ALU output compared to zero, or the relation of the two compare/exchange inputs. All eight logical combinations, including unconditional TRUE and FALSE are possible. The result of the OR of all the bits showing through the condition mask forms the condition. Based on this condition, the current instruction may be executed or not. Likewise, based on this condition, the two inputs to the compare/exchange unit may be swapped. This latter feature is useful for control functions, such as filter frequencies that are being changed in real time. In this manner, it is possible to specify a control function in piecewise-linear form, such that each segment has an increment, a current value, and a final value. When the current valve passes the final value, the compare/exchange unit can be employed to substitute the final value. Similarly, other piecewise-linear functions can be simulated, such as the absolute value of a number.

For doing all the "other" operations that are needed, such as boolean functions, a general-purpose arithmetic-logical unit 64 is included. This provides AND, OR, and EXCLUSIVE-OR, as well as addition and subtraction. Furthermore, a second register is included for accumulation of high-order bits in multiple-precision operations (i.e., the carry bit is accessible), with optional sign-extension of either or both operands.

The main bulk memory 58 of the DSP is arranged in boards of two banks of 128K 24-bit words each. Up to eight boards may be connected to each DSP. Each bank can be cycled simultaneously such that two 24-bit transfers may be accomplished each 450-ns interval. Error detection and correction are pipelined with the memory cycle.

There are two addressing schemes for the main memory: the DSP has an address calculation engine 74, consisting of a shift matrix and an adder to provide 2-dimensional addressing capabilities. This is most useful for table lookup with tables of power-of-two lengths. The shift matrix scales down the address such that the entire 24-bit range is reduced to correspond to the length of the table, then the origin of the table is added in to produce the final address. The high-order 17 bits of this combined number are used as the memory address and the low order 14 bits (24 bits plus a possible 7-position shift) are available to the multiplexers for interpolation. This makes operations such as continuously variable delay lines quite simple. Likewise, special functions, like square root or arctangent, can be accomplished to a limited precision by table lookup and interpolation. For interpolation, it is possible to store the function values in one memory bank and the differences between adjacent values in the other bank, so that the difference and the low-order address bits may be forwarded directly to the multiplier for the interpolation calculation.

The second addressing scheme is asynchronous and is not under the control of the DSP micro-engine. This is the direct memory access 60 from the disk. There is a separate word count and memory address counter for this data path. The DMA is operated on a "cycle stealing" basis, in that it uses cycles when the DSP is not referencing the memory. If four memory boards are used (out of eight possible), a total of 1M 24-bit words of storage is supplied, which is sufficient for disk buffering with some space for other functions such as delay lines and table lookups.

The update processor 52 stores the update queue, a linked list, implemented in hardware, of triples (opcode, address, and data). The opcodes specify for the most part which memory is to be written, but one of the opcodes is critically important for timing updates: that is the WAIT-UNTIL code. In this operation, the address and data are taken as a single 32-bit number and compared to a sample number counter that is incremented automatically each time the DSP program counter is reset to zero (that is, at the beginning of each sample calculation). The operation of the queue is as follows: up to 8 computers may give update transactions. The priority arrangement 22 selects one transaction and forwards it to the specified DSP. The transaction code (different from the opcode) tells the disposition of this transaction, such as (1) insert at beginning of queue, (2) insert at end of queue, and (3) insert at specified address in queue (i.e. after a specified element of the queue). At the end of the processing for a sample, all the DSPs will go into update mode. In this mode, triples are read from the head of the update queue (if it is non-empty) and the appropriate actions are taken at the rate of 50- ns per update. If the operation code specified WAIT-UNTIL, then the datum is compared to the sample number. If the datum is greater than the sample number, then updates for that DSP will be halted, and the WAIT-UNTIL will not be removed from the queue. If the datum is less than or equal to the sample number, then the WAIT-UNTIL is removed from the queue and updates proceed as described above. When all the DSPs have either emptied their queues or have hit an unsatisfied WAIT-UNTIL, they will all simultaneously exit update mode and start again at instruction zero. If there are no updates to do, all DSPs will spend a total of four instruction times (200 ns) in update mode. Each computer forwards changes which are to be made at a specific time to the DSP as fast as it can. When that time comes, the DSP will be held in update mode until all of those changes are made. The net result is that large amounts of changes can be made (up to 255 per DSP) that appear to happen entirely between two samples. This occurs quite often in audio processing, since each time that a new sound is begun, it typically requires an amount of processing (filtering, reverberation, etc.) that must be commenced at the same time. This involves, as often as not, the "splicing" of new processing elements into the audio stream. If the splicing is done in the wron order, discontinuities in the signal can result. This problem is solved by making a group of updates into an indivisible unit that are all effected at the same "time." Likewise, in order not to slow down the DSP, the changes are accumulated and effected at the natural rate of the DSP, rather than at the somewhat slower rate of the controlling computer.

In the case of real-time manual intervention such that changes are not known beforehand, such as when the operator is manipulating a potentiometer or some other input device, the parameter changes may be introduced ahead of any timed updates that are already in the queue. Such updates are entered at the beginning of the queue, thus going ahead of any WAIT-UNTIL that might delay their effect. Of the computers that can access the date queue by convention, only one is the "queue master" and inserts WAIT-UNTIL instructions. All the others, by convention, insert untimed changes at the beginning of the queue. These conventions simplify the system. Otherwise, two computers that are not perfectly synchronized could insert WAIT-UNTILs that are not in order if sufficient care in the software were not taken to assure that this does not happen.

There is no substantial hardware limit to the rate at which updates can be forwarded to the DSP. The only limit is how fast the suport processors can deliver them, which is a maximum of about 100,000 updates per second for each processor (Motorola 68000 processors). Each DSP can handle a rate of more than 1,200,000 updates per second as a sustained maximum rate.

The SBUS is the "catch-all" for data transfer. It is used to communicate among DSPs, and it is used to send data to the DA converters and read data from the AD converters.

The DSP, through its multiple data paths and unique architecture, is capable of the very high numerical computation rate required for processing many channels of high-quality digitized audio. Both synchronous and asynchronous data exchange proceed at very high sustained rates without interfering with computation. Large blocks of program memory may be changed also without interference with the sample data stream. The DSP is ideally suited to large-scale real-time audio processing applications, such as film sound mixing, special effects processing, and music synthesis.

In FIG. 3 is shown a block diagram of the microinstruction memory 50 which holds the sequence of 96-bit microinstructions that control the DSP. Three registers, a compare and latch are associated with the basic 4096 by 96-bit microinstruction memory (a random access memory) 100. The microinstruction memory 100 and the scratchpad memories (AMEM and BMEM) 54, 56 are initially directly written with a complete set of microinstructions and parameters, respectively, by means, which for clarity, are not shown. Alternatively, the initial microprogram and parameters can be loaded "on the fly" by means of the update queue.

Microinstructions are executed starting at address 0 and determined by the MI ADR register 102 which is incremented every 50 ns and going to MI ADR MAX, a settable register 104. The DSP then goes into UPDATE MODE. When the compare 106 finds an address match, it will stay in UPDATE MODE until it has finished all updates (parameter or microinstruction changes) in the update queue. It then starts again at 0 to MI ADR MAX, deciding which things get selected onto the ABUS and the BBUS from the MI register 110, and which latches will be activated to store things off the ABUS and the BBUS. Certain units such as I/O 68 and bulky memory addressing 74 receive microinstructions directly rather than via the busses. There are no jumps needed in normal audio processing, although one is provided. Additionally, an instruction can be conditionally executed. Preferably, all the DSPs execute together, all starting at instruction 0 at the same time.

During the UPDATE MODE, new microinstruction words from updates are received at latch 108 via the ABUS from the UPD bus. Addresses for the such new microinstruction words are applied to the memory at selector 112 via the ABUS from the UPD bus. Although the maximum number of microinstruction words is 4,096, for a particular sample the maximum number of instructions may be less. Thus, the MI ADR MAX register 104 can also be re-rewritten by updates to allow any number of instructions, up to the maximum per sample, and to allow changes in the number of instructions per sample to be synchronized with the sample counter.

The microinstruction words are four 24-bit numbers designated MI 0, MI 1, MI 2 and MI 3, the last of which serves as a "catch-all" and also as a literal field. The literal field may be gated onto the ABUS or the BBUS, and additionally can be directly selected by particular registers without going through one of the busses. Each microinstruction gives scratchpad addresses, writes enables, specifies what data are to be selected onto the ABUS and the BBUS, and which latches are to be activated to store data from these busses. Other specifications, such as the accumulator routing and ALU functions are also included. Things which did not fit in the microinstruction word are included in MI 3 which changes meaning with different opcodes.

Referring now to the further details of the update systems, the UPD bus is sourced either from the master computer or a console computer via the arbitration unit 22. The bus itself is 55 bits wide. It contains a 24-bit datum, a 12-bit address, a 4-bit update opcode, a 4-bit update transaction opcode (insert in beginning or end of queue, etc.), a 3-bit DSP number, and an optional 8-bit queue address. In some cases, the 36-bit address and datum are combined into a single large datum. The bus is set into operation by a 55-bit UPD command, which includes the following:

```
UPD0:23   Datum
UPD24:35  Address
UPD36:39  Opcode, decoded as follows:
          0  Nop
          1  WAIT-UNTIL - UPD0:31 is a sample number
             to wait for
          2  AMEM WRT
          3  BMEM WRT
          4  MI A WT - Writes into MI 0
          5  MI B WRT - MI 1
          6  MI C WRT - MI 2
          7  MI D WRT - MI 3
          8-9 DISK FUNCTIONS
          10 MI ADR
             Sets MI ADR 0:11 from UPD 0:11
          11 OTHER FUNCTION
          12-15 unused
```

These take on a different meaning if executed immediately, as per transaction code 6 below. When the opcode specifies a memory write (opcodes 2:7), the address portion of the update is used as the memory write address (UPD 24:35).

```
UPD40:43
     0  Nop
     1  INSERT AT BEGINNING
     2  INSERT AFTER
     3  INSERT AT END
     4  DATA WRITE (writes UPD0:39 at adr in UPD47:54)
     5  POINTER WRITE (writes UPD0:7 into pointer
        mem (PMEM) at UPD47:54)
     6  UPDATE IMMEDIATE - bypasses DMEM, hits
        other registers
     7  FREE MEM WRITE (writes UPD0:7 into free list
        pointer mem (PMEM) at UPD47:54)
     8-15 unused
UPD36:39 for UPDATE IMMEDIATE
     0  Nop
     1:2 unused
     3  PULSES - Provides various single pulses from
        data bits, including reset sample counter
     4  UPD REG
        Sets UHEAD from UPD 0:7 (Head of UPD queue)
        Sets UTAIL from UPD 8:15 (Tail of UPD queue)
        Sets UFREE TOP from UPD 16:23 (Top of free list)
     5  MI ADR MAX
        Sets MI ADR MAX 0:11 from UPD 12:23
        (UPD 0:11 are ignored)
UPD44:46
        DSP number
UPD47:54
        optional queue address
```

With the direct writes (transaction codes 4, 5 and 7) the optional queue address portion of the update word (UPD 47:54) is used as the write address. This is how the queue is initialized.

Details of the update processor 52 will now be discussed, first with reference to FIG. 4. The update queue is maintained by three memories (DMEM 120, FMEM 122 and PMEM 124) and by three registers (UHEAD 126, UTAIL 128 and UFREE-TOP 130). The memories are all 256 words long, of which location zero of each should be set to zero (i.e., no update should go there since zero marks the end of the list). DMEM is 40 bits wide because the update bus interface 132 strips off the 4-bit transaction code and the 8-bit address, leaving the datum (24 bits), the address (12 bits) and the opcode (4 bits). FMEM and PMEM are 8 bits wide to hold addresses. FMEM is the free list. The top of the free list (i.e., the address of the first element of the list which represents the first unused location in the DMEM and PMEM) is held in UFREE-TOP. The contents of PMEM at each location should contain the address of the next free element. Zero marks the end of the list. These addresses refer to locations in the DMEM and the PMEM which will be used in updates. The PMEM contains the links to (i.e., addresses of) successive updates in the DMEM. UHEAD is the address (in PMEM and DMEM) of the first update in the list, and UTAIL is the address of the last. These are both zero if the list is empty. At initialize time, the free list is linked up and the UPD registers are initialized to the appropriate values. This is done by an update with a transaction code of 6 (UPDATE IMMEDIATE) with an opcode of 4 (UPD-REG). This loads UHEAD from UPD 0:7, UTAIL from UPD 8:15, and UFREE-TOP from 16:23. UHEAD and UTAIL should be initialized to zero, indicating an empty list. Also, at initialize time, direct writes must be made into FMEM in order to construct the linked list of all 255 elements. This declares as free the entire queue.

Table A is a state machine listing that defines the actions of a microsequencer 140 that controls the multiplexers 142, 144, 146, 148, 150, 152 and 154 to define the operations performed for each of the transactions for entering into the queue (except direct writes). It functions between the update bus and the update queue. Microsequencer 140 receives the transaction code, the opcode and status inputs from the UPD bus. The status inputs are the one-bit status of UHEAD, UTAIL and UFREE-TOP (i.e. is UHEAD=zero?, etc.) Table B is a state machine listing that defines the actions of microsequencer 156 that controls the same set of multiplexers to define the operations performed for each of the transactions for removing from the queue. These operations are performed during the DSPs update mode. The microsequencer 156 receives only the opcode and status inputs from the UPD bus. The hardware implementation of microsequencers from state machine listings are well known. Arrows mean "goes to".

TABLE A

STANDARD PREAMBLE
(Performed before any update is entered)

UFREE-TOP → UFREE-TOP TMP
UHEAD → UHEAD TMP
UTAIL → UTAIL TMP
FMEM (UFREE-TOP) → FREE    (address of remainder, or second element, of free list)
PMEM (UHEAD) → PTR    (address of remainder, or second element, of queue)

Note that prior to the standard preamble, the queue must be initialized so that FMEM(0)= =0, PMEM(0)= =0, and DMEM(0)= =0, (i.e.-NOP).

(1) INSERT AT END
  UPD 0:39 → DMEM (UFREE-TOP TMP)
  UFREE-TOP TMP → PTR (UTAIL TMP)
  0 → PTR (UFREE-TOP TMP)
  UFREE-TOP TMP → UTAIL
  FREE → UFREE-TOP
  If UHEAD = = 0, UFREE-TOP TMP → UHEAD
(2) INSERT AT BEGINNING
  UPD 0:39 → DMEM (UFREE-TOP TMP)
  UHEAD TMP → PMEM (UFREE-TOP TMP)
  UFREE-TOP TMP → UHEAD
  If UTAIL = = 0, UFREE-TOP TMP → UTAIL
  FREE → UFREE-TOP
(3) INSERT AFTER (If UFREE = = 0, INSERT AT END is done instead)
  UPD 0:39 → DMEM (UFREE-TOP TMP)
  PMEM (UPD 47:54) → PTR
  PTR → PMEM (UFREE-TOP TMP)
  UFREE-TOP TMP → PMEM (UPD 47:54)
  FREE → UFREE-TOP

TABLE B (1) NORMAL UPDATE (If UHEAD = 0)
  UFREE-TOP TMP → FMEM (UHEAD TMP)
  PTR → UHEAD
  If PTR = = 0, 0 → UTAIL
  UHEAD TMP → UFREE-TOP
(2) UPDATE backup (If WAIT-UNTIL not satisfied)
  If UHEAD = = 0, UFREE-TOP TMP → UTAIL
  UFREE-TOP TMP → UHEAD
  FREE → UFREE-TOP Operations (1) and (2) form an indivisible pair, that is, a new data cannot be admitted to the queue between (1) and (2).

New entries can be added to the queue at any time. Entries are removed from the list for execution only during the update mode.

For each of the insertion operations (INSERT AT END, INSERT AT BEGINNING and INSERT AFTER), the data and new pointer is written in DMEM and PMEM at the address specified in UFREE-TOP (and held temporarily in the register 132 UFREE-TOP TMP). If INSERT AT END is specified, a zero is written into the PMEM at UFREE-TOP and a copy of UFREE-TOP is written into the PMEM at the address specified by UTAIL (and held temporarily in the register 134 UTAIL TMP). This links the new queue entry to the last queue entry. In INSERT AT BEGINNING, the contents of UHEAD are written into the PMEM at the address specified by UFREE-TOP. In INSERT AFTER, the contents of the PMEM at the address specified by UPD 47:54 are read and rewritten into the PMEM at UFREE-TOP, then UFREE-TOP is written into the PMEM at UPD 47:54. This links the new entry into the list at the specified position. Note that this implementation of the state machine does not work right if the address specified is the last element of the list (i.e., corresponds to the contents of UTAIL). In this case, the linkage will be made properly, but UTAIL will not be updated. This will cause no harm until another INSERT AT END is done, at which point the previously inserted queue entry will be lost and its address will not be returned to the free list. The state machine may be modified to avoid this "bug".

Each time something is entered ino the queue via one of these three operations, an UPD RETURN is generated, returning to the master computer 24 the address where the entry was placed (i.e. a copy of UFREE-TOP TMP) and a few other bits representing the state of the update system. These could come very quickly, as often as one per 400 ns. Direct writes into the various UPD memories do not generate a UPD RETURN. Only INSERT AT END, INSERT AT BEGINNING and INSERT AFTER generate UPD RETURNs.

On each update cycle, the entry at the front of the memory is examined by compare 136. If it is a WAIT-UNTIL, the combined data and address portion is compared with the sample number from the sample counter 138. If the difference of UPD 0:31 and the sample number is positive or zero, the read address for the update memory (UHEAD) will be overwritten by the contents of the pointer mem or (PTR) (i.e., the WAIT-UNTIL will be popped off the list). Otherwise, the update cycle repeats. If another element is inserted at the beginning of the memory, it will be processed before the WAIT-UNTIL is uncovered again.

When the DSPs go into update mode (after the instructions counter equals MI ADR MAX), if UHEAD is non-zero, a fetch is done from DMEM. If the datum in the DMEM at UHEAD is a WAIT-UNTIL and the sample number represented by UPD 0:31 has not been reached yet, it is replaced back onto the head of the queue in one indivisible operation and the process starts again. If the instruction is a WAIT-UNTIL and the sample number has been reached or passed, or if it is not a WAIT-UNTIL, UPD 0:23 is placed on the ABUS, UPD 24:35 are placed on the BBUS, and the appropriate control signals are generated to perform the operation indicated by the opcode UPD 36:39. Additionally, the PMEM at UHEAD is read and this is used to set UHEAD to the next element of the list (or zero if it is the end of the list). Likewise, FMEM at the address specified by UHEAD (before it is set from the PMEM) is overwritten by UFREE-TOP, and UFREE-TOP set to the contents of UHEAD, thus placing the queue entry back on the free list.

All the DSPs will stay in update mode until they all either exhaust the queue (all UHEAD==0), or are resting on WAIT-UNTILs that are not yet satisfied. At this time, all the DSPs will simultaneously come out of update mode, all the sample counters will be incremented by one, and all the DSPs will execute instruction 0 again. A common line to all DSPs, designated the update request line, is asserted by any DSP where UHEAD is non-zero or a WAIT-UNTIL is unsatisfied. When it goes de-asserted then all the DSPs come out of update mode.

I claim:

1. In a digital processor that receives timed and untimed commands, apparatus for storing and ordering the commands for execution by the processor comprising:
   means for storing the said commands in a linked list,
   means for inserting timed commands in the list, and
   means for inserting untimed commands in locations in the list that are in order for execution before the timed commands.

2. The apparatus of claim 2 wherein said means for inserting timed commands in the list includes means for the ordered interleaving further timed commands with timed commands already inserted in the list.

3. The apparatus of claims 1 or 2 wherein said digital processor is programmable and said commands include instructions that control the programming of the processor.

4. The apparatus of claims 1 or 2 wherein the digital processor includes memory means for storing data used in processing and said commands include instructions that write data in said memory means.

5. The apparatus of claims 1 or 2 wherein said digital processor is a high speed processor for digital audio signals.

6. The apparatus of claim 2 wherein each command is in the form of a digital word that includes data and an indication that the command is timed or untimed, and if timed, where the command is to be interleaved with existing timed commands in the list.

7. In a digital processor that receives timed and untimed commands, a method of storing and ordering commands for execution by the processor comprising:
   storing said commands in a linked list,
   inserting timed commands in the list, and
   inserting untimed commands in locations in the list that are in order for execution before the timed commands.

8. The method of claim 7 further comprising:
   interleaving in timed order further timed commands with timed commands already inserted in the list.

* * * * *

UNITED STATES PATENT AND TRADEMARK OFFICE
CERTIFICATE OF CORRECTION

PATENT NO. : 4,497,023
DATED : Jan. 29, 1985
INVENTOR(S) : Moorer

It is certified that error appears in the above-identified patent and that said Letters Patent is hereby corrected as shown below:

Column 17, line 22: "claim 2" should be --claim 1--, and

Column 17, line 24: "the" (at beginning of line) should be --time--.

Signed and Sealed this

Twenty-eighth Day of May 1985

[SEAL]

Attest:

DONALD J. QUIGG

Attesting Officer

Acting Commissioner of Patents and Trademarks